(12) United States Patent
Muralidhar et al.

(10) Patent No.: US 9,915,462 B2
(45) Date of Patent: Mar. 13, 2018

(54) CURRENT DRAW CONTROL IN A TRANSPORT REFRIGERATON SYSTEM

(71) Applicant: THERMO KING CORPORATION, Minneapolis, MN (US)

(72) Inventors: Ashok Muralidhar, Eagan, MN (US); Titilope Z. Sule, Columbia Heights, MN (US); Nathan Patrick Longen, Mahtomedi, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 562 days.

(21) Appl. No.: 14/582,278

(22) Filed: Dec. 24, 2014

(65) Prior Publication Data

US 2015/0183292 A1  Jul. 2, 2015

Related U.S. Application Data

(60) Provisional application No. 61/920,857, filed on Dec. 26, 2013.

(51) Int. Cl.
| | | |
|---|---|---|
| *F25D 17/06* | (2006.01) | |
| *F25B 1/00* | (2006.01) | |
| *G01K 13/00* | (2006.01) | |
| *B60H 1/32* | (2006.01) | |
| *G05D 11/00* | (2006.01) | |
| *F25D 11/00* | (2006.01) | |

(52) U.S. Cl.
CPC .......... *F25D 11/003* (2013.01); *B60H 1/3211* (2013.01); *B60H 1/3232* (2013.01); *B60H 2001/3273* (2013.01)

(58) Field of Classification Search
CPC ................ B60H 1/3211; B60H 1/3232; B60H 2001/3273; F25D 11/003
USPC ............................................ 62/115, 129, 133
See application file for complete search history.

(56) References Cited

U.S. PATENT DOCUMENTS

| 4,217,646 A | * | 8/1980 | Caltagirone | ......... F24F 11/0009 |
| | | | | 165/205 |
| 4,817,705 A | * | 4/1989 | Levine | .................... F23N 5/203 |
| | | | | 165/243 |
| 4,910,966 A | * | 3/1990 | Levine | .................. F25B 47/025 |
| | | | | 62/129 |
| 5,123,252 A | * | 6/1992 | Hanson | ................ B60H 1/3225 |
| | | | | 165/256 |

(Continued)

OTHER PUBLICATIONS

Hardware Secrets—Everything you need to know about the CPU C-States Power Saving Modes, Sep. 5, 2008.*

*Primary Examiner* — Henry Crenshaw
(74) *Attorney, Agent, or Firm* — Hamre, Schumann, Mueller & Larson, P.C.

(57) ABSTRACT

A system and method for controlling a current draw in a transport refrigeration system (TRS) including an electronically controlled engine having an engine control unit (ECU) are disclosed. The method includes disabling the ECU in response to the electronically controlled engine entering an operating mode in which the electronically controlled engine is not running. The TRS controller determines an ambient temperature based on a temperature outside an internal space of the refrigerated transport unit. The TRS controller initializes an ECU off timer when the ambient temperature is less than or equal to an ambient temperature threshold.

20 Claims, 4 Drawing Sheets

(56) References Cited

U.S. PATENT DOCUMENTS

| | | | |
|---|---|---|---|
| 5,186,015 A * | 2/1993 | Roehrich | B60H 1/3208 123/179.4 |
| 5,186,149 A * | 2/1993 | Kitajima | F02D 41/0025 123/1 A |
| 5,524,444 A * | 6/1996 | Gromala | F25D 29/00 236/78 D |
| 5,867,996 A | 2/1999 | Takano et al. | |
| 6,112,807 A * | 9/2000 | Dage | B60H 1/3207 165/202 |
| 6,688,121 B2 | 2/2004 | Tada et al. | |
| 7,143,596 B2 | 12/2006 | Yonekura et al. | |
| 8,347,642 B2 | 1/2013 | Akahoshi et al. | |
| 8,561,915 B2 | 10/2013 | Ishida et al. | |
| 8,707,718 B2 | 4/2014 | Chen et al. | |
| 8,720,500 B2 | 5/2014 | Maier | |
| 2003/0105983 A1 * | 6/2003 | Brakmo | G06F 1/3203 713/320 |
| 2004/0144107 A1 | 7/2004 | Breton et al. | |
| 2004/0231833 A1 | 11/2004 | Wang et al. | |
| 2005/0109499 A1 | 5/2005 | Iwanami et al. | |
| 2007/0046428 A1 * | 3/2007 | Mamaloukas | E05F 15/77 340/5.61 |
| 2010/0250039 A1 * | 9/2010 | Bryan | B60K 6/445 701/22 |
| 2011/0023509 A1 | 2/2011 | Gardiner | |
| 2011/0246977 A1 * | 10/2011 | Parsons | G06F 8/65 717/171 |
| 2013/0283826 A1 | 3/2013 | Burnham et al. | |
| 2013/0340444 A1 | 6/2013 | Bryant et al. | |
| 2014/0116076 A1 | 5/2014 | Kato et al. | |

* cited by examiner

CURRENT DRAW CONTROL IN A TRANSPORT REFRIGERATON SYSTEM

FIELD

Embodiments of this disclosure relate generally to a transport refrigeration system (TRS). More specifically, the embodiments relate to a system for controlling a current draw in a TRS including an electronically controlled engine having an engine control unit (ECU).

BACKGROUND

A transport refrigeration system (TRS) is generally used to cool a refrigerated container (e.g., a container on a flat car, an intermodal container, etc.), a truck, a boxcar, or other similar transport unit (generally referred to as a "refrigerated transport unit"). A refrigerated transport unit is commonly used to transport perishable items such as produce, frozen foods, and meat products. The refrigerated transport unit can have a controlled environmental condition (e.g., temperature, humidity, air quality, and the like) in a cargo space during transport. Typically, a transport refrigeration unit (TRU) is attached to the refrigerated transport unit to control the environmental condition of the cargo space. The TRU can include, without limitation, a compressor, a condenser, an expansion valve, an evaporator, and fans or blowers to control the heat exchange between the air inside the cargo space and the ambient air outside of the refrigerated transport unit.

SUMMARY

Embodiments of this disclosure relate generally to a transport refrigeration system (TRS). More specifically, the embodiments relate to a system for controlling a current draw in a TRS including an electronically controlled engine having an engine control unit (ECU).

Embodiments of this disclosure provide systems and methods for a TRS controller to disable an ECU of a transport refrigeration unit (TRU) or an ECU connected to a generator in a TRS to control current draw from a battery of the TRS. The TRS controller is configured to determine whether and how long to disable the ECU to reduce its current draw from the battery.

In some embodiments, disabling an ECU can increase the period of time during which the TRS can remain in a not running mode (sometimes referred to as a NULL operating mode, etc.). Increasing the duration of time in which the TRS is in the not running mode can, for example, decrease the fuel consumption of the electronically controlled engine. In some embodiments, disabling the ECU can also increase the life of the battery by reducing the current draw while the engine is in the not running mode.

In some embodiments, the ECU is disabled when an electronically controlled engine enters an operating mode in which the electronically controlled engine is not running. An ECU off timer can be initialized when an ambient temperature is below an ambient temperature threshold. Alternatively, the TRS controller can continue to monitor the ambient temperature (without initializing an ECU off timer) when the ambient temperature is above the ambient temperature threshold. The ECU can be enabled when the ECU off timer expires. In some embodiments, the ECU is enabled for a period of time sufficient to check an engine parameter and disabled once the period of time has expired.

In some embodiments, a duration of the ECU off timer is determined from a lookup table. The lookup table can, for example, include durations for the ECU off timer as a function of ambient temperature.

A method of operating a TRS for a refrigerated transport unit, the TRS including a transport refrigeration unit (TRU) controlled by a TRS controller and powered by an electrically controlled engine having an engine control unit (ECU) is disclosed. The method includes disabling the ECU in response to the electronically controlled engine entering an operating mode in which the electronically controlled engine is not running. The TRS controller determines an ambient temperature based on a temperature outside an internal space of the refrigerated transport unit. The TRS controller initializes an ECU off timer when the ambient temperature is less than or equal to an ambient temperature threshold.

A TRS for a refrigerated transport unit is disclosed. The TRS includes an electronically controlled engine including an engine control unit (ECU). The TRS also includes a transport refrigeration unit (TRU) attached to the refrigerated transport unit. The TRU includes a TRS controller programmed to disable the ECU in response to the electronically controlled engine entering an operating mode in which the electronically controlled engine is not running, determine an ambient temperature based on a temperature outside an internal space of the refrigerated transport unit, and initialize an ECU off timer when the ambient temperature is less than or equal to an ambient temperature threshold. The TRS also includes a communication interface bus configured to connect the TRS controller to the ECU, wherein the TRS controller is programmed to receive engine sensor data from the ECU via the communication interface bus.

BRIEF DESCRIPTION OF THE DRAWINGS

References are made to the accompanying drawings that form a part of this disclosure, and which illustrate the embodiments in which the systems and methods described in this specification can be practiced.

Like reference numbers represent like parts throughout.

DETAILED DESCRIPTION

Figure 1:
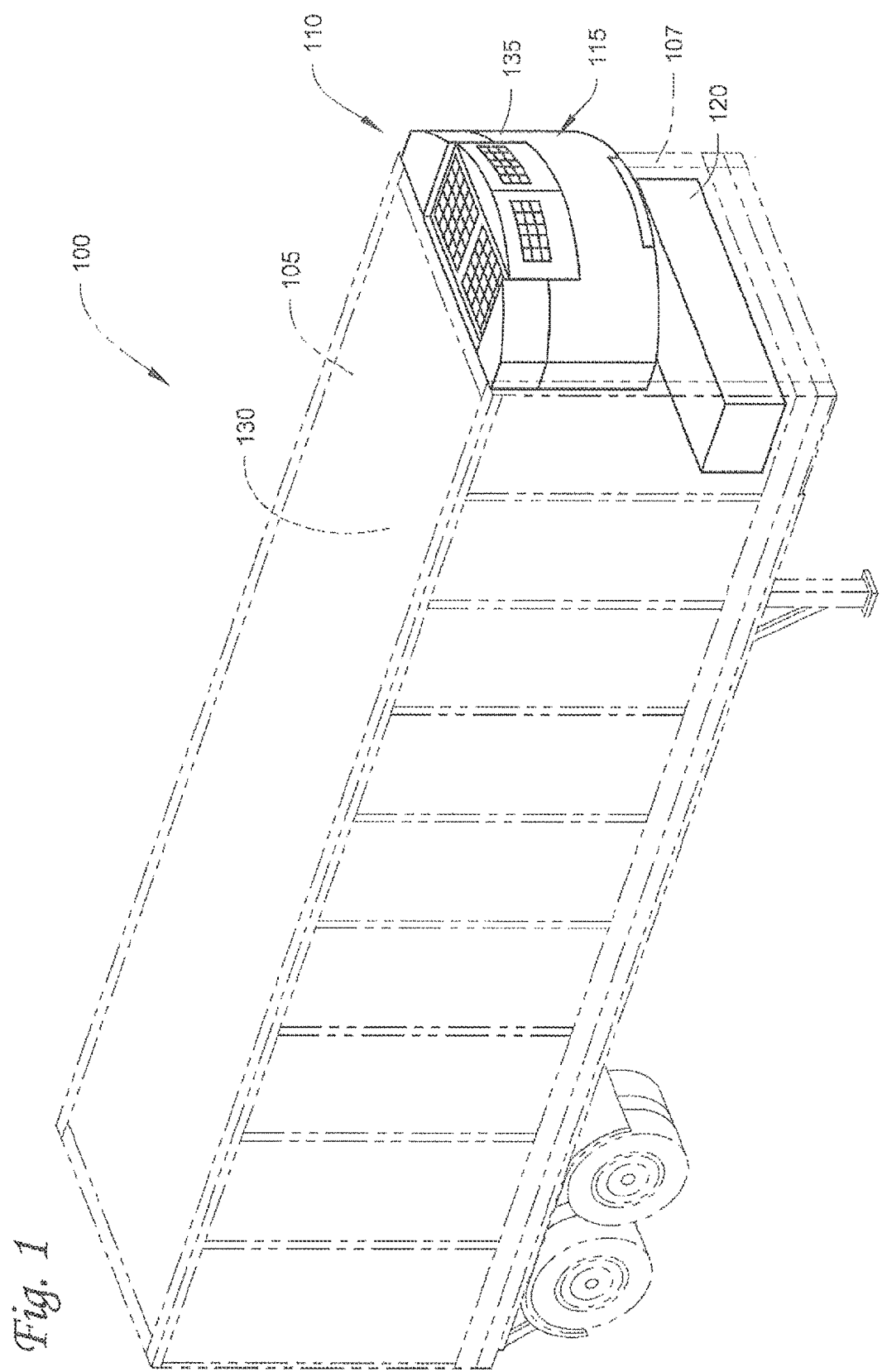
FIG. 1 illustrates a side view of a refrigerated transport unit including a trailer, according to some embodiments.

Embodiments of this disclosure relate generally to a transport refrigeration system (TRS). More specifically, the embodiments relate to a system for controlling a current draw in a TRS including an electronically controlled engine having an engine control unit (ECU).

A TRS can include an electronically controlled engine (e.g., a diesel powered internal combustion engine, etc.) having an engine control unit (ECU). The electronically controlled engine can be coupled to a component (e.g., a compressor, etc.) of a transport refrigeration unit (TRU) to provide mechanical power to the component. The electronically controlled engine can alternatively be connected to a generator configured to provide electrical power to drive a prime mover (e.g., an electric drive motor, etc.) in the TRU.

The electronically controlled engine can operate in a variety of modes, such as, but not limited to, a Cycle Sentry Mode and a Continuous Mode. The Continuous Mode may continuously run the electronically controlled engine, providing a constant airflow to an interior space of a refrigerated transport unit. The Cycle Sentry Mode may start and stop the electronically controlled engine to maintain the environmental condition of the interior space, to keep the engine warm, to charge the battery, etc. Accordingly, the Cycle Sentry Mode can include an engine not running mode and an engine running mode. The modes of operation can represent similar functionality but be referred to differently. For example, the Cycle Sentry Mode can represent any mode of operation that involves starting and stopping the engine. The Cycle Sentry Mode can, for example, provide fuel savings since the electronically controlled engine is not continuously running. The ECU of the electronically controlled engine may, however, continue to draw current from a battery while the electronically controlled engine is not running. The current draw may cause a restart of the electronically controlled engine in order to recharge the battery. As a result, the fuel savings provided by the Cycle Sentry mode of operation may not be realized. Embodiments described in this specification are directed to controlling operation of the ECU in order to limit the current draw from the battery. As a result, the electronically controlled engine may be restarted less frequently to recharge the battery and, in some embodiments, less fuel may be consumed.

A "refrigerated transport unit" includes, for example, a refrigerated container (e.g., a container on a flat car, an intermodal container, etc.), a truck, a boxcar, or other similar transport unit.

A "transport refrigeration system" (TRS) includes, for example, a refrigeration system for controlling the refrigeration of an interior space of a refrigerated transport unit. The TRS may be a vapor-compressor type refrigeration system, or any other suitable refrigeration system that can use refrigerant, cold plate technology, or the like.

A "TRS controller" includes, for example, an electronic device that is configured to manage, command, direct, and regulate the behavior of one or more TRS refrigeration components of a refrigeration circuit (e.g., an evaporator, a condenser, a compressor, an expansion valve (EXV) etc.), a generator, an electronic throttling valve (ETV), etc.

Embodiments of this disclosure may be used in any suitable environmentally controlled transport apparatus, such as, but not limited to, a ship board container, an air cargo cabin, and an over the road truck cabin. The TRS may be a vapor-compressor type refrigeration system, or any other suitable refrigeration system that can use refrigerant, cold plate technology, or the like.

FIG. 1 illustrates a side view of a refrigerated transport unit 100 including a trailer 105. The trailer 105 includes a transport refrigeration system (TRS) 110. The TRS 110 includes a transport refrigeration unit (TRU) 115 connected to a generator 120 including an engine (not shown). In some embodiments, the TRS 110 does not include the generator 120 and the engine is provided in the TRU 115. The trailer 105 can be disposed on a ship, on a train, towed by a truck, etc. The TRU 115 is provided on a front wall 107 of the trailer 105. A housing 135 encloses the TRU 115. The TRS 110 is configured to control an environmental condition such as, but not limited to, temperature, humidity, or air quality of an interior space 130 of the trailer 105. In some embodiments, the interior space 130 can alternatively be referred to as the conditioned space 130, the cargo space 130, the environmentally controlled space 130, and the like. The TRS 110 is configured to transfer heat between the interior space 130 and the outside environment.

In some embodiments, the interior space 130 can include one or more partitions or internal walls for at least partially dividing the interior space 130 into zones or compartments. In such embodiments, the TRS 110 can be a multi-zone system in which the different zones or areas of the interior space 130 are individually controlled to meet different refrigeration requirements based on the cargo stored in a particular zone (e.g., a zone for fresh goods, a zone for frozen goods, etc.).

The TRU 115 is in communication with the interior space 130 and controls the environmental condition (e.g., temperature, humidity, air quality, etc.) of the interior space 130. The TRU 115 includes a TRS controller (e.g., TRS controller 205 shown in FIG. 2) and a closed refrigeration circuit (not shown). The TRS controller controls the refrigeration circuit to obtain the environmental condition (e.g., temperature, humidity, air quality, etc.) in the interior space 130. The TRS controller can be powered by the generator 120, according to some embodiments. In other embodiments, the TRS controller can be powered by a TRU battery (e.g., TRU battery 240 shown in FIG. 2) and/or a backup battery (not shown). The closed refrigeration circuit regulates the environmental condition (e.g., temperature, humidity, air quality, etc.) of the interior space 130 based on an instruction received from the TRS controller. The refrigeration circuit can, for example, include an electronic throttling valve (ETV), a compressor coupled to a condenser, and an evaporator that cools the interior space 130 and the contents stored therein.

Figure 2:
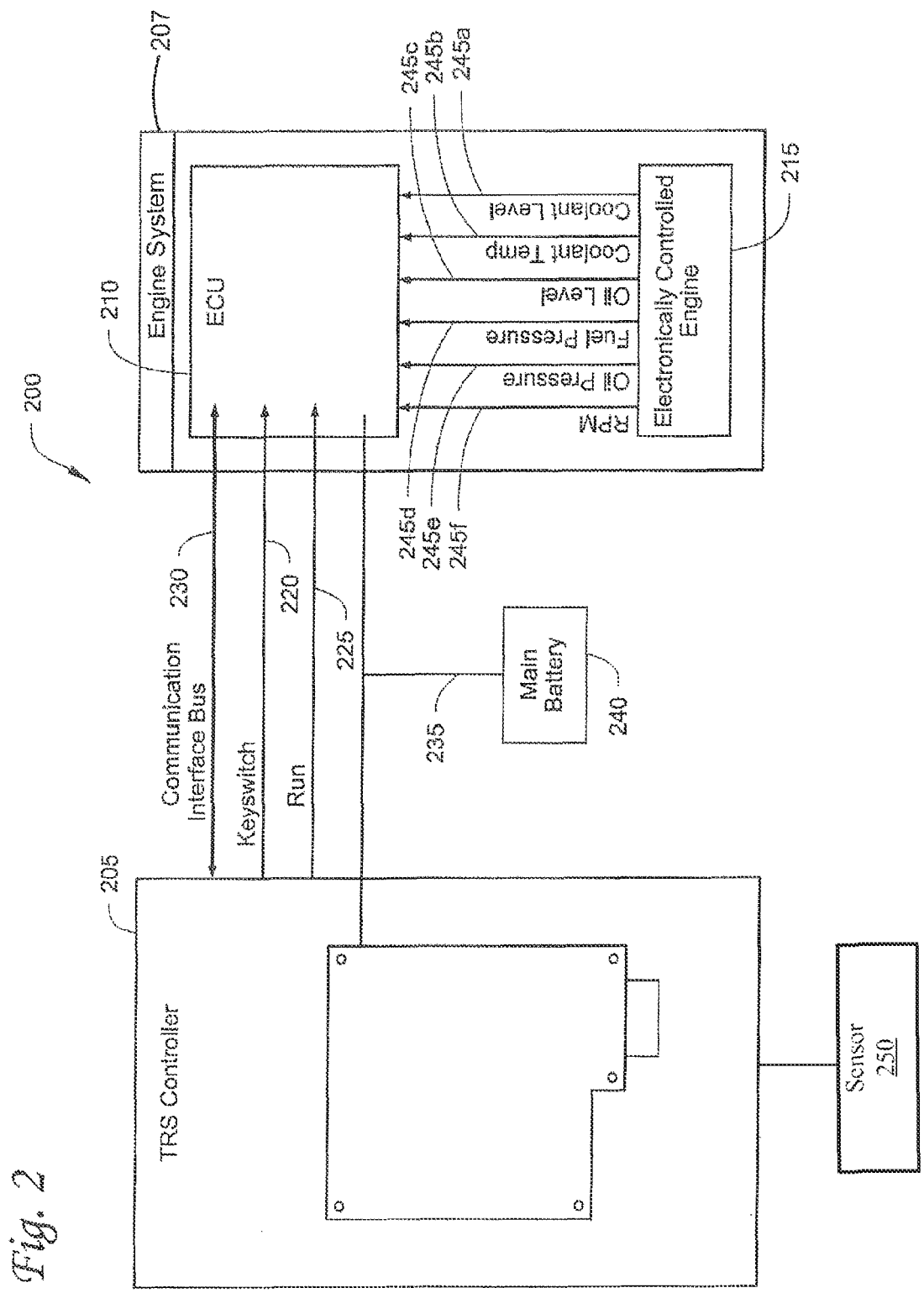
FIG. 2 illustrates a diagram of an interface within a transport refrigeration system (TRS), according to some embodiments.

The TRS 110 includes an electronically controlled engine (e.g., electronically controlled engine 215 shown in FIG. 2) having an engine control unit (ECU) (e.g., ECU 210 shown in FIG. 2). In some embodiments, the engine is an electronically controlled internal combustion engine (e.g., a diesel engine, etc.) that may generally have a cooling system (e.g., water or liquid coolant system), an oil lubrication system, and an electrical system. An air filtration system filters air directed into a combustion chamber of the engine. In some embodiments, the engine is not specifically configured for the TRS 110, but can be a non-industrial electronically controlled engine such as an electronically controlled automotive engine. In some embodiments, the electronically controlled engine can be configured to meet an environmental requirement such as, but not limited to, one or more emissions requirements provided by an environmental protection agency such as the Environmental Protection Agency (EPA) in the United States. For example, the electronically controlled engine may be configured to meet Tier-4 emissions requirements. A fuel container (not shown) is in fluid communication with the electronically controlled engine to deliver a supply of fuel to the electronically controlled engine.

In some embodiments, the electronically controlled engine is configured to provide mechanical power directly to a component (e.g., a compressor, etc.) of the TRS 110. The electronically controlled engine can be coupled to the component of the TRS 110 via a drive system such as, but not limited to, a belt (not shown), a chain (not shown), or the like, such that the speed of the component is proportional to the speed of the electronically controlled engine. In other embodiments, the electronically controlled engine is part of the generator 120. In such embodiments, the generator 120 provides electrical power to a prime mover (e.g., an electric drive motor), which in turn provides mechanical power to a component (e.g., a compressor, etc.) of the TRS 110.

The electronically controlled engine is controlled by the ECU. The ECU can be configured, for example, to regulate an amount of fuel delivered to the engine, to control the speed of the engine, and the like. As discussed in additional detail below, the ECU is in communication with the TRS controller to control the environmental condition of the interior space 130.

The electronically controlled engine can operate in a variety of modes, such as, but not limited to, a Cycle Sentry Mode and a Continuous Mode. The Continuous Mode may continuously run the electronically controlled engine, providing a constant airflow to the interior space 130. The Cycle Sentry Mode may start and stop the electronically controlled engine to maintain the environmental condition of the interior space 130, to keep the engine warm, to charge the battery, etc. The modes of operation can represent similar functionality but be referred to differently. For example, the Cycle Sentry Mode can represent any mode of operation that involves starting and stopping the engine. The Cycle Sentry Mode can include an engine not running mode (e.g., a NULL mode) and an engine running mode.

The refrigerated transport unit 100, as illustrated, is a trailer-type refrigerated transport unit. Embodiments as described in this specification can be used with other types of refrigerated transport units. For example, the refrigerated transport unit 100 can represent a container (e.g., a container on a flat car, an intermodal container, etc.), a truck, a boxcar, or other similar type of refrigerated transport unit including an environmentally controlled interior space.

FIG. 2 illustrates a diagram of an interface 200 within the TRS 110 (FIG. 1). The interface 200 represents the interface between a TRS controller 205 and an ECU 210. The ECU 210 is part of an engine system 207 that includes the ECU 210 and an electronically controlled engine 215. In some embodiments, the electronically controlled engine 215 is an electronically controlled engine configured to meet an emissions requirement of the EPA (e.g., Tier-4, etc.).

The interface 200 includes a keyswitch connection 220 that is configured to send a keyswitch signal from the TRS controller 205 to the ECU 210, a run signal connection 225 that is configured to send a run signal from the TRS controller 205 to the ECU 210, and a communication interface bus 230 that is configured to provide two-way communication between the TRS controller 205 and the ECU 210.

The interface 200 includes a main battery connection 235 for providing power from a main battery 240 to the TRS controller 205 and the ECU 210. The main battery 240 is a 12-volt battery, according to some embodiments.

In some embodiments, the keyswitch connection 220 and the run signal connection 225 are wired connections. In other embodiments, the keyswitch connection 220 and the run signal connection 225 can be a wireless connection in which digital data messages can be transmitted between the TRS controller 205 and the ECU 210. In some embodiments, the keyswitch connection 220 and the run signal connection 225 are configured to transmit and receive data using a wireless communication protocol, such as, but not limited to, ZigBee, Bluetooth, or any other type of wireless communication protocol that allows for accurate transmission of data between the TRS controller 205 and the ECU 210 while the refrigerated transport unit 100 is in transport.

The keyswitch connection 220 is configured to enable the ECU 210 for engine sub-system operation, disable the ECU 210, and to facilitate TRS power management. In one embodiment, the keyswitch connection 220 can perform the above functions by invoking a high/active logic state and/or a low/inactive logic state. When in the high/active logic state, the keyswitch connection 220 is configured to enable communication between the TRS controller 205 and the engine 215 via the ECU 210. When the keyswitch connection 220 transitions from the high/active logic state to the low/inactive logic state, the ECU 210 is configured to enter a power latch stage prior to completely shutting off. The ECU 210 is configured to command a pre-shutdown component calibration and is configured to write data to permanent memory.

The run signal connection 225 is configured to, via the ECU 210, prepare the engine 215 for starting, instruct the engine 215 to stop, reinitialize an ECU 210 start routine, and manage power consumption of the TRS 110 generally. In some embodiments, the run signal connection 225 can perform the above functions by invoking a high/active logic state and/or a low/inactive logic state. When in the high/active logic state, the run signal connection 225 is configured to prepare the engine 215, via the ECU 210, for starting. When the run signal connection 225 transitions from the high/active logic state to the low/inactive logic state and the engine 215 is running, the run signal connection 225 is configured to instruct the engine 215, via the ECU 210, to stop. This can reduce power consumption of the main battery 240 while still allowing data communication between the ECU 210 and the TRS controller 205 via the communication interface bus 230.

The communication interface bus 230 is configured to facilitate communication between the TRS controller 205 and the ECU 210. In particular, the communication interface bus 230 is configured to transmit data messages from the TRS controller 205 to the ECU 210 that include, for example, an engine crank command message, an engine target speed command message, an engine stop request message, etc. Accordingly, the TRS controller 205 can instruct the engine 215, via the ECU 210, to stop via the run signal connection 225 or the communication interface bus 230.

The communication interface bus 230 can be a wired connection. For example, the communication interface bus 230 can include a controller area network (CAN) communication interface bus, a Serial interface bus, and the like. In some embodiments, the communication interface bus 230 is a wireless connection in which digital data messages can be transmitted between the TRS controller 205 and the ECU 210. In some embodiments, the communication interface bus 230 is configured to transmit and receive data using a wireless communication protocol, such as, but not limited to, ZigBee, Bluetooth, or any other type of wireless communication protocol that allows for accurate transmission of data between the TRS controller 205 and the ECU 210 while the refrigerated transport unit 100 is in transport.

The electronically controlled engine 215 includes a plurality of engine data sensors 245 that provide information to the ECU 210. For example, the engine data sensors 245 can include a coolant level sensor 245*a*, a coolant temperature sensor 245*b*, an oil level sensor 245*c*, a fuel pressure sensor 245*d*, an oil pressure sensor 245*e*, an engine speed sensor 245*f*, etc. The ECU 210 can include fewer or additional engine data sensors 245, according to some embodiments. Examples of additional engine data sensors include, but are not limited to, an oil temperature sensor, a fuel temperature sensor, and the like.

The TRS controller 205 is configured to set and control a TRU operating mode of the TRU 115. The TRU operating modes can include, for example, a heating mode, a cooling mode, a defrost mode, etc. The TRS controller 205 is also configured to set and control TRU 115 configuration settings based on the TRU 115 operating mode. The TRS 110 configuration settings can, for example, include a TRU 115 Cycle Sentry Mode (e.g., engine running or engine not running), or other start/stop TRU 115 configuration settings to maintain the desired conditions within the interior space 130 of the trailer 105. Further, the TRS controller 205 is configured to set and control an engine 215 operating mode of the electronically controlled engine 215, via the ECU 210. The engine 215 operating modes can include modes in which the electronically controlled engine 215 is not running and modes in which the electronically controlled engine 215 is running. When the TRS controller 205 sets the electronically controlled engine 215 to an engine 215 operating mode in which the engine 215 is not running, the ECU 210 can be disabled.

For the purposes of this application, the ECU 210 is disabled when both the keyswitch connection 220 and the run signal connection 225 are in a low/inactive logic state, and the main battery 240 is providing minimum power to the ECU 210 so that the ECU 210 can be activated when the keyswitch connection 220 is switched by the TRS controller 205 into the high/active logic state. In some embodiments, the ECU 210 being disabled can also be referred to as a minimum electrical power consumption stage. The ECU 210 is enabled when the keyswitch connection 220 is in the high/active logic state and the run signal connection 225 is in a low/inactive logic state. In some embodiments, the ECU 210 being enabled can also be referred to as an electrical power consumption stage that is higher than the minimum electrical power consumption stage.

The TRS controller 205 is in communication with a sensor 250. The sensor 250 can, for example, be an ambient temperature sensor configured to obtain temperature data of the ambient air outside the trailer 105. The ambient temperature can, for example, be used to determine whether to enable or disable the ECU 210 when the engine 215 is not running (e.g., in a NULL mode of the Cycle Sentry Mode, etc.). The TRS controller 205 can be configured to receive the ambient temperature data from the sensor 250 periodically. For example, the TRS controller 205 can receive the ambient temperature data about every second, about every 5 seconds, etc.

As described in further detail in accordance with FIGS. 3A and 3B below, the TRS controller 205 can disable the ECU 210 when entering an engine not running mode (e.g., a NULL mode of the Cycle Sentry Mode or similar mode with the electronically controlled engine 215 not running). Depending upon the ambient temperature, the TRS controller 205 can determine whether to enable the ECU 210 in order to check an engine parameter (e.g., coolant temperature, etc.) and determine whether an engine operating mode should change from a mode in which the electronically controlled engine 215 is not running to a mode in which the electronically controlled engine 215 is running. The TRS controller 205 can keep the ECU 210 enabled when the electronically controlled engine 215 is running. This reduces a current draw from the ECU 210 on the battery 240 during, for example, an engine not running mode (e.g., a NULL mode of the Cycle Sentry Mode or other start/stop TRU modes). Thus, the embodiments described in this specification can lower fuel usage of the TRS 110, lower maintenance cost of the engine, and reduce excessive depletion of battery power while the TRU 115 of the TRS 110 is in, for example, an engine not running mode.

Figure 3A:
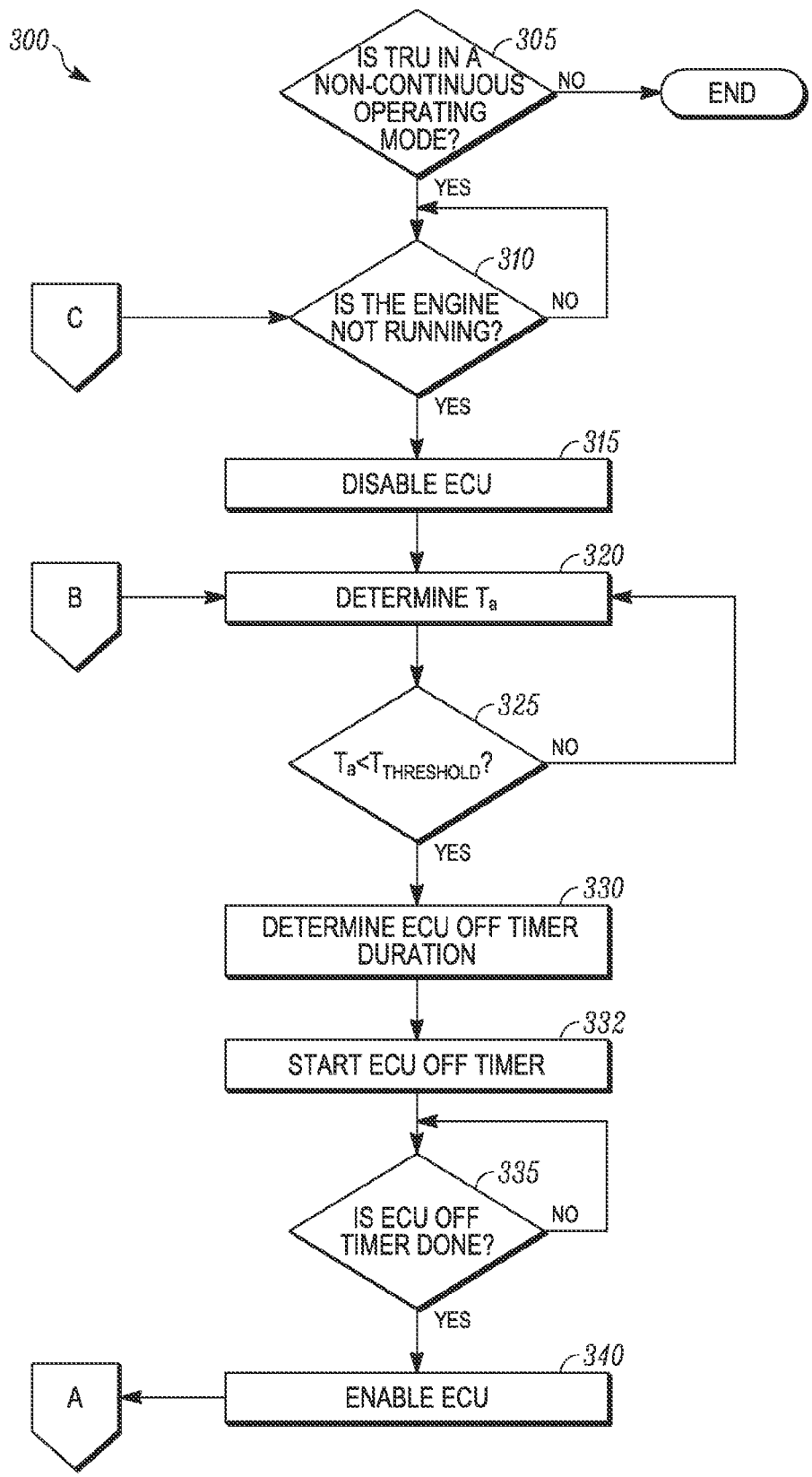
FIG. 3A illustrates a flowchart of a method to control operation of an engine control unit (ECU), according to some embodiments.
Figure 3B:
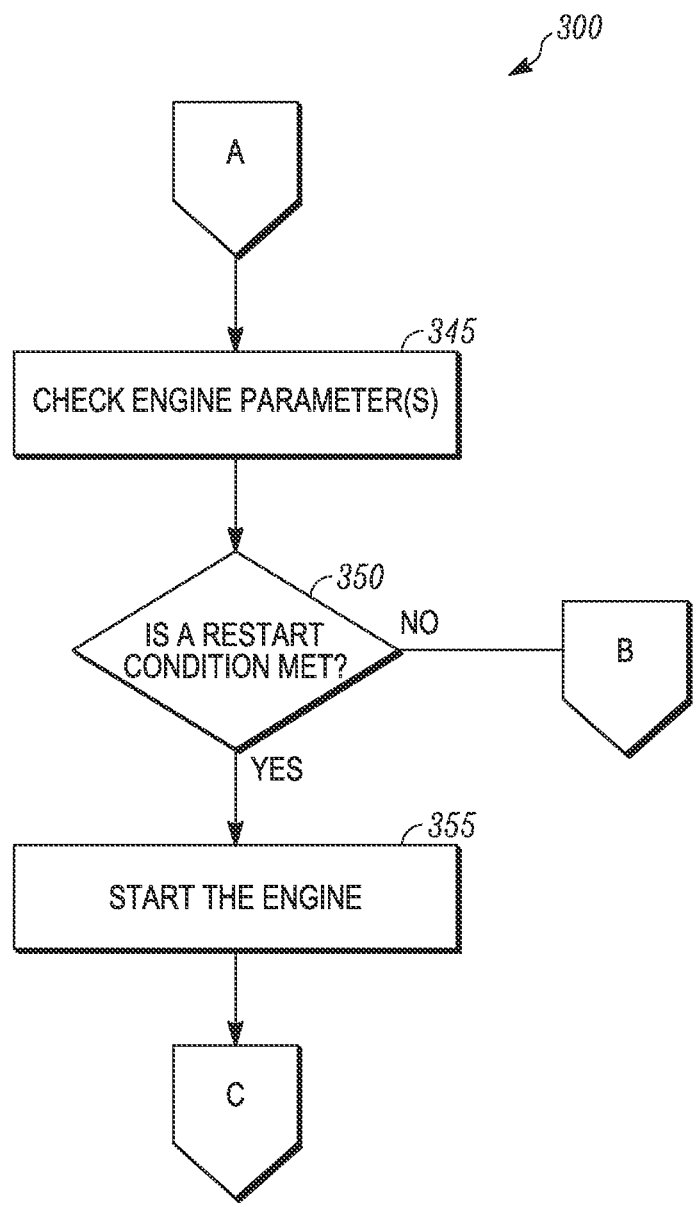
FIG. 3B illustrates a continuation of the flowchart of FIG. 3A of the method to control operation of the ECU, according to some embodiments.

FIGS. 3A and 3B illustrate a flowchart of a method 300 to control operation of the ECU 210 (FIG. 2). The method 300 begins at 305 where the TRS controller 205 determines whether the TRU 115 is operating in a non-continuous mode. In some embodiments, the non-continuous mode can be referred to as the Cycle Sentry mode, while in other embodiments the non-continuous mode can be a start/stop mode similar to a Cycle Sentry mode, but referred to differently.

If the TRU 115 is not operating in a non-continuous mode (e.g., the TRU 115 is operating in a continuous mode, etc.) then the TRS controller 205 terminates operation of the method 300. In some embodiments, the TRS controller 205 can continue to monitor for a non-continuous mode at 305 instead of terminating the operation of the method 300. If the TRU 115 is operating in a non-continuous mode, then the TRS controller 205 determines whether the electronically controlled engine 215 is not running (e.g., the electronically controlled engine is in the NULL mode) at 310.

If the electronically controlled engine 215 is not in a not running mode (e.g., the NULL mode has not been entered) then the TRS controller 205 repeats 310 and continues to monitor for the engine not running mode. If the TRU 115 has entered the engine not running mode (e.g., the NULL mode), the TRS controller 205 disables the ECU 210 at 315. Disabling the ECU 210 can include setting the keyswitch connection 220 to a low/inactive state. Disabling the ECU 210 can, in some embodiments, reduce the current draw of the ECU 210 from the battery 240. In some embodiments, this can increase an amount of time that the TRU 115 is able to remain in the engine not running mode (e.g., the electronically controlled engine 215 can remain off without the battery 240 needing to be charged, etc.). In some embodiments, increasing the amount of time that the TRU 115 is in the engine not running mode can reduce the fuel consumed by the electronically controlled engine 215. Decreasing the current draw of the ECU 210 from the battery 240 may increase a life of the battery 240 before replacement. In some embodiments, increasing the amount of time that the TRU 115 remains in the engine not running mode can increase the lifetime of the electronically controlled engine 215.

Once the TRS controller 205 disables the ECU 210, the TRS controller 205 determines the ambient temperature $T_a$ at 320. The ambient temperature $T_a$ can be read from the sensor 250. Once the ambient temperature $T_a$ has been determined, the TRS controller 205 compares the ambient temperature $T_a$ with an ambient temperature threshold $T_{threshold}$ at 325. The ambient temperature threshold $T_{threshold}$ can, for example, be based on a user preference, simulation testing, etc. In some embodiments, the ambient temperature threshold $T_{threshold}$ may be a default value capable of being overridden by a user. For example, the ambient temperature threshold $T_{threshold}$ can be about 32 degrees Fahrenheit. The ambient temperature threshold $T_{threshold}$ represents a temperature at which one or more engine parameters (e.g., coolant temperature, etc.) is to be checked on a periodic basis, requiring a periodic enabling of the ECU 210.

If the ambient temperature $T_a$ is greater than the ambient temperature threshold $T_{threshold}$, then the method 300 returns to 320 and continues to monitor the ambient temperature $T_a$. The ECU 210 remains disabled until the ambient temperature $T_a$ is below the ambient temperature threshold $T_{threshold}$. In some embodiments, the ECU 210 may also be enabled if a condition other than the ambient temperature $T_a$ being below the ambient temperature threshold $T_{threshold}$ is met (e.g., if the charge of the battery 240 falls below a minimum charge, etc.). The TRS controller 205 can monitor the ambient temperature $T_a$ about every second in some embodiments, while in other embodiments the TRS controller can be configured to monitor the ambient temperature $T_a$ at an interval other than about every second (e.g., about every 5 seconds, etc.).

If the ambient temperature $T_a$ is less than the ambient temperature threshold $T_{threshold}$, then the TRS controller 205 determines an ECU off timer duration at 330. The duration of the ECU off timer can be determined based on the ambient temperature. In some embodiments, the duration of the ECU off timer can be determined from a lookup table including a duration for the ECU off timer as a function of ambient temperature. In some embodiments, as the ambient temperature decreases (e.g., further from the ambient temperature threshold $T_{threshold}$) the duration of the ECU off timer decreases as well. That is, at colder ambient temperatures, the ECU 210 may be checked more often than at warmer temperatures. At 332, the TRS controller 205 starts the ECU off timer.

After starting the ECU off timer, the method 300 continues to 335 and determines whether the ECU off timer is complete. If the ECU off timer is not complete, then the method 300 returns to 335 and continues to check the status of the ECU off timer. When the ECU off timer has completed, the TRS controller 205 enables the ECU 210 at 340. The ECU 210 may be enabled for a limited period of time ranging, for example, but not limited to, from about one millisecond to about one minute. In some embodiments, the ECU 210 can be enabled for a time period ranging from about 10 seconds to about 30 seconds. In some embodiments, the ECU 210 can be enabled for a time period ranging from about 15 seconds to about 20 seconds. The time period may represent a time period for the ECU 210 to read one or more engine data sensors 245 and provide feedback to the TRS controller 205.

At 345, the TRS controller 205 determines an engine parameter. The TRS controller 205 can determine the engine parameter from the data sensors 245. The engine parameter may be used to identify a status of the electronically controlled engine 215. For example, the engine parameter can be a coolant temperature from the coolant temperature sensor 245b and can be used to determine whether to restart the electronically controlled engine 215. For example, if the coolant temperature becomes too low, it may be difficult to restart the electronically controlled engine 215.

At 350 the TRS controller 205 determines whether a restart condition is met. Determining whether a restart condition is met can include comparing the determined engine parameter with a threshold for the particular engine parameter. For example, a restart condition can include restarting the electronically controlled engine 215 when the coolant temperature of the electronically controlled engine is less than a minimum coolant temperature $T_{min}$. For example, if the engine parameter is the coolant temperature of the electronically controlled engine 215, then the coolant temperature is compared with the minimum coolant temperature $T_{min}$. If the coolant temperature is less than the minimum coolant temperature $T_{min}$, the restart condition is met and the electronically controlled engine 215 may be restarted. Accordingly, the TRS controller 205 sends a run signal to start the electronically controlled engine 215 at 355. Alternatively, if the engine parameter does not create a restart condition, the method 300 continues to 320 and determines the ambient temperature $T_a$.

If the electronically controlled engine 215 is started at 355, then the method 300 continues to operation 310 and waits for the engine not running mode.

The method 300 can, in some embodiments, repeat while the electronically controlled engine 215 and the TRU 115 receive power from the battery 240.

Aspects:

It is noted that any of aspects 1-10 below can be combined with any of aspects 11-20.

Aspect 1. A method of operating a transport refrigeration system (TRS) for a refrigerated transport unit, the TRS including a transport refrigeration unit (TRU) controlled by a TRS controller and powered by an electrically controlled engine having an engine control unit (ECU), comprising:

disabling the ECU in response to the electronically controlled engine entering an operating mode in which the electronically controlled engine is not running;

determining, by the TRS controller, an ambient temperature based on a temperature outside an internal space of the refrigerated transport unit;

determining a duration for an ECU off timer when the ambient temperature is less than or equal to an ambient temperature threshold; and starting the ECU off timer.

Aspect 2. The method according to aspect 1, further comprising:

monitoring the ambient temperature when the ambient temperature is greater than the ambient temperature threshold.

Aspect 3. The method according to any of aspects 1-2, wherein determining the duration for the ECU off timer includes basing the duration of the ECU off timer on the ambient temperature.

Aspect 4. The method according to aspect 3, wherein determining the duration of the ECU off timer includes:

determining the duration for the ECU off timer from a lookup table, wherein the lookup table includes a listing of ECU off timer durations as a function of ambient temperature.

Aspect 5. The method according to any of aspects 1-4, wherein disabling the ECU includes setting, by the TRS controller, a keyswitch signal from the TRS controller to the ECU to an inactive state.

Aspect 6. The method according to any of aspects 1-5, further comprising:

enabling the ECU when the ECU off timer expires, the enabling including setting, by the TRS controller, a keyswitch signal from the TRS controller to the ECU to an active state; and determining an engine parameter from the ECU via a communication interface bus, the engine parameter based on a reading from an engine data sensor of the ECU.

Aspect 7. The method according to aspect 6, wherein the ECU is enabled for a minimum time period to determine the engine parameter from the ECU.

Aspect 8. The method according to any of aspects 6-7, further comprising: disabling the ECU when the minimum time period expires.

Aspect 9. The method according to any of aspects 6-8, further comprising:

sending, by the TRS controller, a run signal from the TRS controller to the ECU to start the electronically controlled engine when a restart condition is met.

Aspect 10. The method according to aspect 9, wherein the restart condition is met when a coolant temperature is less than a minimum coolant temperature.

Aspect 11. A transport refrigeration system (TRS) for a refrigerated transport unit, the transport refrigeration system comprising:

an electronically controlled engine including an engine control unit (ECU);

a transport refrigeration unit (TRU) attached to the refrigerated transport unit, the TRU including a TRS controller programmed to:

disable the ECU in response to the electronically controlled engine entering an operating mode in which the electronically controlled engine is not running;

determine an ambient temperature based on a temperature outside an internal space of the refrigerated transport unit;

determine a duration for an ECU off timer when the ambient temperature is less than or equal to an ambient temperature threshold; and start the ECU off timer; and a communication interface bus configured to connect the TRS controller to the ECU, wherein the TRS controller is programmed to receive engine sensor data from the ECU via the communication interface bus.

Aspect 12. The TRS according to aspect 11, further comprising:

a keyswitch connection configured to connect the TRS controller to the ECU, wherein the TRS controller is programmed to set the keyswitch connection to an inactive state to disable the ECU and an active state to enable the ECU.

Aspect 13. The TRS according to any of aspects 11-12, wherein the ambient temperature is determined from an ambient temperature sensor.

Aspect 14. The TRS according to aspect 11, wherein the TRS controller is further programmed to:

enable the ECU when the ECU off timer expires; and determine an engine parameter from the ECU via the communication interface bus, the engine parameter based on the engine sensor data from the ECU.

Aspect 15. The TRS according to any of aspects 11-14, wherein the duration of the ECU off timer is based on an ambient temperature.

Aspect 16. The TRS according to aspect 15, wherein the duration of the ECU off timer is based on a lookup table, wherein the lookup table includes a listing of ECU off timer durations as a function of ambient temperature.

Aspect 17. The TRS according to any of aspects 14-16, wherein the TRS controller is further programmed to:

send a run signal to the ECU to start the electronically controlled engine when a restart condition is met.

Aspect 18. The TRS according to aspect 17, wherein the restart condition is met when a coolant temperature is less than a minimum coolant temperature.

Aspect 19. The TRS according to any of aspects 11-18, wherein the communication interface bus is a controller area network (CAN) communication interface bus.

Aspect 20. The TRS according to any of aspects 11-18, wherein the communication interface bus is a Serial communication interface bus.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

What is claimed is:

1. A method of operating a transport refrigeration system (TRS) for a refrigerated transport unit, the TRS including a transport refrigeration unit (TRU) controlled by a TRS controller and powered by an electrically controlled engine having an engine control unit (ECU), comprising:

disabling the ECU in response to the electronically controlled engine entering an operating mode in which the electronically controlled engine is not running;

determining, by the TRS controller, an ambient temperature based on a temperature outside an internal space of the refrigerated transport unit;

determining a duration for an ECU off timer when the ambient temperature is less than or equal to an ambient temperature threshold, wherein the duration for the ECU off timer decreases as the ambient temperature decreases; and starting the ECU off timer.

2. The method according to claim 1, further comprising: monitoring the ambient temperature when the ambient temperature is greater than the ambient temperature threshold.

3. The method according to claim 1, wherein determining the duration for the ECU off timer includes basing the duration of the ECU off timer on the ambient temperature.

4. The method according to claim 3, wherein determining the duration of the ECU off timer includes:

determining the duration for the ECU off timer from a lookup table, wherein the lookup table includes a listing of ECU off timer durations as a function of ambient temperature.

5. The method according to claim 1, wherein disabling the ECU includes setting, by the TRS controller, a keyswitch signal from the TRS controller to the ECU to an inactive state.

6. The method according to claim 1, further comprising:

enabling the ECU when the ECU off timer expires, the enabling including setting, by the TRS controller, a keyswitch signal from the TRS controller to the ECU to an active state; and determining an engine parameter from the ECU via a communication interface bus, the engine parameter based on a reading from an engine data sensor of the ECU.

7. The method according to claim 6, wherein the ECU is enabled for a minimum time period to determine the engine parameter from the ECU.

8. The method according to claim 6, further comprising: disabling the ECU when the minimum time period expires.

9. The method according to claim 6, further comprising: sending, by the TRS controller, a run signal from the TRS controller to the ECU to start the electronically controlled engine when a restart condition is met.

10. The method according to claim 9, wherein the restart condition is met when a coolant temperature is less than a minimum coolant temperature.

11. A transport refrigeration system (TRS) for a refrigerated transport unit, the transport refrigeration system comprising:
an electronically controlled engine including an engine control unit (ECU);
a transport refrigeration unit (TRU) attached to the refrigerated transport unit, the TRU including a TRS controller programmed to:
disable the ECU in response to the electronically controlled engine entering an operating mode in which the electronically controlled engine is not running;
determine an ambient temperature based on a temperature outside an internal space of the refrigerated transport unit;
determine a duration for an ECU off timer when the ambient temperature is less than or equal to an ambient temperature threshold, wherein the duration for the ECU timer decreases as the ambient temperature decreases; and
start the ECU off timer; and
a communication interface bus configured to connect the TRS controller to the ECU, wherein the TRS controller is programmed to receive engine sensor data from the ECU via the communication interface bus.

12. The TRS according to claim 11, further comprising:
a keyswitch connection configured to connect the TRS controller to the ECU, wherein the TRS controller is programmed to set the keyswitch connection to an inactive state to disable the ECU and an active state to enable the ECU.

13. The TRS according to claim 11, wherein the ambient temperature is determined from an ambient temperature sensor.

14. The TRS according to claim 11, wherein the TRS controller is further programmed to:
enable the ECU when the ECU off timer expires; and
determine an engine parameter from the ECU via the communication interface bus, the engine parameter based on the engine sensor data from the ECU.

15. The TRS according to claim 11, wherein the duration of the ECU off timer is based on an ambient temperature.

16. The TRS according to claim 15, wherein the duration of the ECU off timer is based on a lookup table, wherein the lookup table includes a listing of ECU off timer durations as a function of ambient temperature.

17. The TRS according to claim 14, wherein the TRS controller is further programmed to:
send a run signal to the ECU to start the electronically controlled engine when a restart condition is met.

18. The TRS according to claim 17, wherein the restart condition is met when a coolant temperature is less than a minimum coolant temperature.

19. The TRS according to claim 11, wherein the communication interface bus is a controller area network (CAN) communication interface bus.

20. The TRS according to claim 11, wherein the communication interface bus is a Serial communication interface bus.

* * * * *